United States Patent [19]
Gregorian et al.

[11] 3,764,628
[45] Oct. 9, 1973

[54] TERTIARY-TERTIARY BISPEROXIDES

[75] Inventors: Razmic S. Gregorian, Silver Spring; Richard A. Bafford, Baltimore, both of Md.

[73] Assignee: W. R. Grace & Co., New York, N.Y.

[22] Filed: July 29, 1960

[21] Appl. No.: 46,096

Related U.S. Application Data

[63] Continuation-in-part of Ser. No. 946, Jan. 7, 1960, Pat. No. 3,118,866.

[52] U.S. Cl....... 260/610 R, 260/395, 260/94.9 GA
[51] Int. Cl............................................ C07c 73/00
[58] Field of Search................. 260/610, 610 R, 395

[56] References Cited
UNITED STATES PATENTS
| | | | |
|---|---|---|---|
| 2,403,758 | 7/1946 | Rust | 260/610 |
| 2,813,127 | 11/1957 | White | 260/610 |
| 2,916,481 | 12/1959 | Gilmont | 260/610 X |
| 2,957,030 | 10/1960 | Bankert | 260/610 |
| 3,118,866 | 1/1964 | Gregorian | 260/610 |

OTHER PUBLICATIONS
Organic Peroxides, Taholsky et al., Pg. 1, 1954.

*Primary Examiner*—Bernard Helfin
*Attorney*—Richard P. Plunkett and Kenneth E. Prince

[57] ABSTRACT

Tertiary-tertiary bisperoxides having the general formula:

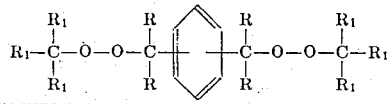

wherein R is an alkyl and $R_1$ is an aryl or alkyl groups which have utility as crosslinking agents for polyethylene.

3 Claims, No Drawings

TERTIARY-TERTIARY BISPEROXIDES

This application is a continuation-in-part of application having Ser. No. 946 filed Jan. 7, 1960, now U.S. Pat. No. 3,118,866 which subsequently reissued as Re. 25,941.

This invention relates the synthesis of a novel class of bisperoxides. More particularly this invention pertains to a novel class of tertiary-tertiary aralkyl bisperoxides.

The novel tertiary-tertiary bisperoxides of this invention have the general formula:

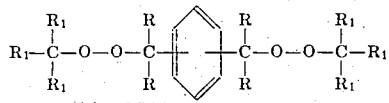

where R is an alkyl and $R_1$, is an aryl or alkyl group.

The novel tertiary-tertiary bisperoxides of the present invention are prepared by acid-catalyzed condensation of a dihydroxy compound with a hydroperoxide.

Recent art has taught the preparation of primary-tertiary diperoxides of the general formula:

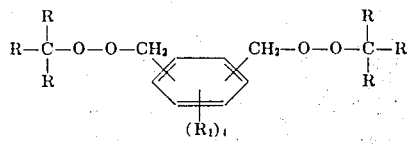

wherein R and $R_1$ represent the same or different hydrocarbyl radicals, which comprises reacting a hydroperoxide and a bis-(halomethyl)-tetrahydrocarbyl substituted benzene in the presence of a base. See U.S. Pat. No. 2,813,127. These afore-mentioned latter diperoxides have many drawbacks, however, that affect their commercial development. For example, these diperoxides cannot be made by the acid method (benzyl alcohols are polymerized by strong acids). Additionally, these diperoxides are rapidly decomposed by strong bases. See U.S. Pat. No. 2,813,127 column 3, lines 5-12 and 49-50, and also Organic Peroxides, A.V. Tobolsky and R. B. Mesrobian, page 122, Interscience Publishers, Inc., New York, N.Y., 1954. Because of said base decomposition these latter diperoxides give poor yields on synthesis and great care must be taken to maintain pH control. Furthermore, to diminish the base-catalyzed decomposition of the resulting diperoxide product, it is necessary to have blocking alkyl groups ortho to the primary group. By blocking alkyl groups is meant a crowding of alkyl groups about the benzylic hydrogens to hinder abstraction of said hydrogens by a base.

On the other hand the novel tertiary-tertiary bisperoxides of the present invention are not decomposed by base, but are insensitive thereto. This is important in rubber curing when the bisperoxides are admixed with compounds such as carbon black, which can range from acidic to basic. The novel bisperoxides of this invention have improved heat stability and therefore can be used in curing rubber. An additional use is as a crosslinking agent for polyethylene which will be more fully described hereinafter.

Summarily, tertiary-tertiary aralkyl bisperoxides of the formula:

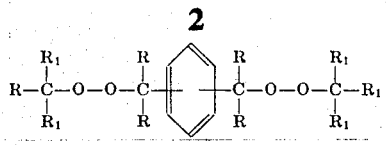

are produced in accordance with the instant invention by reacting a mole of an alcohol of the formula:

with at least two moles of a tertiary hydroperoxide of the formula:

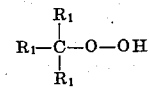

where in all the aforementioned formulas R is an alkyl and $R_1$ is an aryl or alkyl in the presence of an acid condensation catalyst.

The reaction is carried out at temperatures below about 40°C. The acid catalyst is added slowly to the alcohol to maintain the temperature in the range 0° to 5°C. so as to minimize dehydration of the alcohol. Once the acid is added, the reaction temperature is allowed to go up to room temperature or higher e.g. 40°C. to increase the reaction rate following the addition of the tertiary hydroperoxide.

It is not necessary to use a solvent in performing the reaction. However, an organic solvent such as ether, benzene, toluene and the like may be employed if desired.

The acids operable as a catalyst in this invention include sulfuric acid, phosphoric acid, p-toluene sulfonic acid and other acid condensation catalysts well known to those skilled in the art. The amount of acid employed as a catalyst is not critical. Acid amounts in the range 0.05 to 1 mole of acid per mole of hydroxyl group in the tertiary alcohol are operable in practising this invention. It should be remembered, however, that the acid catalyst is preferably added slowly to the alcohol at low temperatures, e.g. about 0°C. to insure that the alcohol is not dehydrated.

The tertiary alcohols of the formula

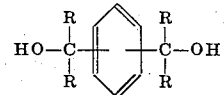

wherein R is an alkyl employable as reactants in the instant invention are prepared by reacting a diester with a Grignard reagent in absolute ether at room temperature. The thus-formed magnesium salt of the tertiary alcohol is decomposed with water yielding the tertiary alcohol.

Various tertiary alcohols are usable as a reactant in this invention. Such alcohols include $\alpha\alpha\alpha'\alpha'$ tetramethyl isophthalyl, $\alpha\alpha\alpha'\alpha'$ tetramethyl phthalyl, $\alpha\alpha\alpha'\alpha'$ tetramethyl terephthalyl, $\alpha\alpha\alpha'\alpha'$ tetraethyl isophthalyl, $\alpha\alpha\alpha'\alpha'$ tetraethyl phthalyl, $\alpha\alpha\alpha'\alpha'$ tetraethyl terephthalyl, $\alpha\alpha\alpha'\alpha'$ tetrapropyl isophthalyl, $\alpha\alpha\alpha'\alpha'$ tetrapropyl phthalyl, $\alpha\alpha\alpha'\alpha'$ tetrapropyl terephthalyl, $\alpha\alpha\alpha'\alpha'$ tetradecyl isophthalyl, $\alpha\alpha\alpha'\alpha'$ tetradecyl phthalyl, and ααα'α' tetradecyl terephthalyl alcohol. An example will be given hereinafter showing the preparation of the tertiary alcohols reactants.

The tertiary hydroperoxides of the formula

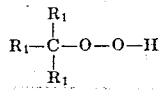

wherein $R_1$ is an aryl or alkyl, are prepared by methods well known in the art, e.g., oxidation of branched hydrocarbons. Tertiary hydroperoxides which are operable herein as a reactant include t-butyl hydroperoxide, cumyl hydroperoxide, di-isopropylbenzene hydroperoxide, menthane hydroperoxide, p-t-butyl cumene hydroperoxide, decalin hydroperoxide, triphenylmethyl hydroperoxide, etc.

The following examples will more clearly illustrate the instant invention but are not to be deemed as limiting its scope.

EXAMPLE I

PREPARATION OF A TERTIARY ALCOHOL

To a 3-necked, round bottom 5 liter flask equipped with reflux condenser and stirrer containing 1,000 ml. of absolute ether was added 105.6 g. Mg followed by the addition of 624.8 g. methyl iodide in 1,000 ml. of absolute ether (diethyl oxide). 194. g. Dimethyl isophthalate in 1,200 ml. absolute ether was slowly added with stirring to the flask. The reaction was continued for 16 hours at about 37°C. The Grignard complex was decomposed with aqueous hydrochloric acid. The aqueous layer containing $MgCl_2$ was removed in a separatory funnel. The ether layer was evaporated to dryness and the residue crystallized from methanol. The ααα'α' tetramethyl isophthalyl alcohol residue product, i.e.

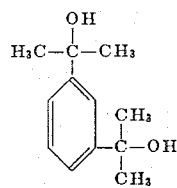

weighed 89 g. and had a melting point of 138°–140°C.

EXAMPLE 2

To a 250 ml. 3 necked round bottom flask equipped with stirrer, dropping funnel, and a thermometer was added 19.4 g. of ααα'α' tetramethyl isophthalyl alcohol from Example 1. 28 ml. of 70% sulfuric acid was slowly added to the flask while maintaining a temperature of 0°C. in the flask by means of an ice bath. After the addition of sulfuric acid was completed, 25.7 g. of commercial 70% t-butyl hydroperoxide was added to the flask, the ice bath removed and the reaction was allowed to proceed with stirring at room temperature, i.e. 25°C. for 16 hours. The aqueous layer was removed by a separatory funnel and the remaining organic layer was diluted with ether and washed with a 40% aqueous solution of KOH. The ether layer was dried over $MgSO_4$ and the ether solvent stipped off in vacuo. The 1,3 bis(t-butyl-peroxyisopropyl) benzene product

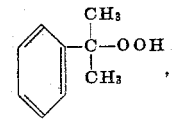

weighed 28 g. and analyzed 76 percent pure. The yield was 82.5 percent of theory based on the weight of the alcohol reactant.

EXAMPLE 3

Using the equipment and procedure of Example 2, except that 43.4 g. of 70% cumene hydroperoxide,

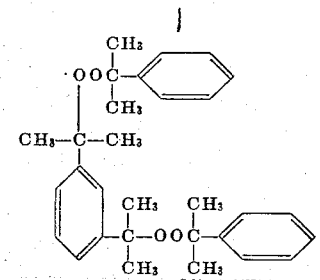

was substituted for the 25.7 g. of 70% t-butyl hydroperoxide in Example 2, resulted in a 1,3 bis(cumylperoxyisopropyl) benzene product, The bisperoxides prepared in accord with the instant invention are especially useful as crosslinking agents for polyethylene. More particularly high density (0.94–0.97) polyethylene, see for example, U.S. Pat. No. 2,816,883, has inferior clarity as compared to conventional low density (0.92) polyethylene. The art has discovered that crosslinking of high density improves the clarity thereof. The problem remains however, that with high density polyethylene having a melting point of 125°–137°C. it is difficult to find a crosslinking agent with a decomposition temperature high enough to allow decomposition to take place at or above the softening point of the polymer.

The bisperoxides herein disclosed are capable of cross-linking high density polyethylene.

In the following examples, the melt indices (MI) were measured under the conditions specified in ASTMD 1238–52T, the densities of the polymer were measured in a density gradient tube by the Bell Laboratories Proposed ASTM Method for the Measurement of Density of solid plastics by the density gradient techniques.

Unless otherwise noted, a Brabender Plastograph Model PL–V2 equipped with a recording unit for measuring changes in torque was used to admix the reactants and determine the degree of crosslinking. The aforesaid recording unit had a range of 0–1000 units equal to 0–1 kg.-meters of torque. This range can be increased when necessary to 0–5000, i.e., equal to 0–5 kg.-meters of torque by the addition of weights. However, other mechanisms, e.g. a Banbury mixer or a tape extruder are equally operable, for the blending step.

The degree of crosslinking is related to the increase in torque ($\Delta\tau$) measured by the Plastograph Recorder from the time the bisperoxide crosslinking agent is added to the fused polymer until the crosslinking reaction is discontinued. The greater the degree of crosslinking the greater the viscosity of the polyethylene, which in turn requires greater torque in order to drive the Plastograph at a constant rpm. The degree of crosslinking which can be accomplished is limited only by the ability of the mixing apparatus to overcome the torque caused by the crosslinking.

A further check on the degree of crosslinking is the decrease in melt index due to crosslinking of the polyethylene. Since melt index varies inversely with viscosity which varies directly with degree of crosslinking, a lower MI after cross-linking evidences that crosslinking occurred.

Unless otherwise noted, all parts and percentages are by weight in the following examples.

EXAMPLE 4

38 g. commercial polyethylene having a melt index of 0.7 and a density of 0.96 were charged over a 2 minute period to to a Brabender Plastograph maintained at a temperature of 190°C. Following an 8 minute conditioning period to fuse the polymer, 1.0 cc. of a 20 percent solution of 1,3 bis(t-butylperoxyisopropyl) benzene, also known as $\alpha\alpha\alpha'\alpha'$ tetramethyl isophthalyl di-t-butyl bisperoxide:

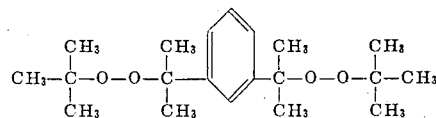

in benzene was added to the fused polymer and milling continued for 2 minutes. $\Delta\tau$ was 3780 units. The cross-linked polyethylene on characterization had a melt index of 0.0.

EXAMPLE 5

38 g. commercial polyethylene in granule form having a melt index of 0.7 and a density of 0.96 were charged over a 4 minute period to a Brabender Plastograph maintained at a temperature of 150°C. After 14 minutes, 1.0 cc. of a 52 percent solution of $\alpha\alpha\alpha'\alpha'$ tetramethyl isophthalyl di-cumyl bisperoxide; also known as 1,3 bis(cumylperoxyisopropyl) benzene:

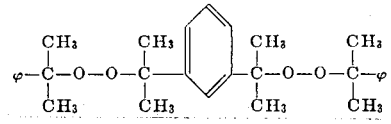

in benzene was added to the fused polyethylene and milling was continued for an additional 7 minutes at which time $\Delta\tau$ was 520 units. The thus-crosslinked polyethylene had a melt index of 0.00.

The use of the novel bisperoxides as crosslinking agents for polyethylene is disclosed and claimed in a copending application filed Jan. 7, 1960 having Ser. No. 946 now U.S. Pat. No. 3,118,866, issued Jan. 21, 1964 and assigned to the same assignee.

We claim:

1. As a composition of matter, a tertiary-tertiary aralkyl bisperoxide of the formula:

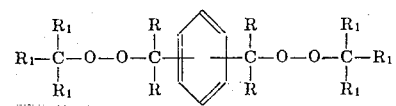

wherein R is a straight chain alkyl containing 1 to 10 carbon atoms and $R_1$ is a member of the radical group consisting of tertiary butyl, $\alpha$ cumyl, diisopropylphenyl, methyl, paratertiary-butyl-$\alpha$-cumyl, decalyl and triphenylmethyl.

2. As a composition of matter, 1,3 bis(t-butylperoxyisopropyl) benzene.

3. As a composition of matter, 1,3 bis(cumylperoxyisopropyl) benzene.

* * * * *

PO-1050
(5/69)

UNITED STATES PATENT OFFICE
CERTIFICATE OF CORRECTION

Patent No. 3,764,628      Dated October 9, 1973

Inventor(s) Razmic S. Gregorian and Richard A. Bafford

It is certified that error appears in the above-identified patent and that said Letters Patent are hereby corrected as shown below:

In Claim 1, column 6, between lines 28 and 34, the formula should read as follows:

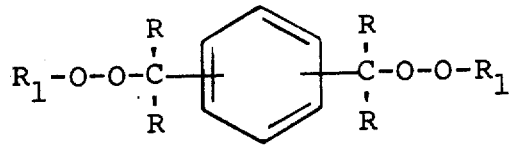

Signed and sealed this 5th day of February 1974.

(SEAL)
Attest:

EDWARD M. FLETCHER, JR.          RENE D. TEGTMEYER
Attesting Officer                Acting Commissioner of Patents

UNITED STATES PATENT AND TRADEMARK OFFICE
CERTIFICATE OF CORRECTION

PATENT NO. : 3,764,628
DATED : October 9, 1973
INVENTOR(S) : Ramzic S. GREGORIAN et al It is certified that error appears in the above-identified patent and that said Letters Patent are hereby corrected as shown below:

Cover page, second line, immediately before "October 9, 1973" insert an asterisk --*--.

Same page, left column, after the "Assignee" line, insert:
--[*] Notice. The portion of the term of this patent subsequent to January 21, 1981 has been disclaimed.--

Signed and Sealed this

Ninth Day of May 1978

[SEAL]

Attest:

RUTH C. MASON
Attesting Officer

LUTRELLE F. PARKER
Acting Commissioner of Patents and Trademarks